US010511084B2

(12) United States Patent
Caballero et al.

(10) Patent No.: US 10,511,084 B2
(45) Date of Patent: *Dec. 17, 2019

(54) ANTENNA SYSTEM WITH ANTENNA SWAPPING AND ANTENNA TUNING

(71) Applicant: Apple Inc., Cupertino, CA (US)

(72) Inventors: Ruben Caballero, San Jose, CA (US); Mattia Pascolini, San Francisco, CA (US); Mohit Narang, Cupertino, CA (US); Matt A. Mow, Los Altos, CA (US); Robert W. Schlub, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/030,726

(22) Filed: Jul. 9, 2018

(65) Prior Publication Data

US 2019/0013570 A1    Jan. 10, 2019

Related U.S. Application Data

(63) Continuation of application No. 15/795,810, filed on Oct. 27, 2017, now Pat. No. 10,020,563, which is a (Continued)

(51) Int. Cl.
*H01Q 9/42*       (2006.01)
*H01Q 1/24*       (2006.01)
(Continued)

(52) U.S. Cl.
CPC .............. *H01Q 1/243* (2013.01); *H01Q 7/00* (2013.01); *H01Q 9/0421* (2013.01); *H01Q 9/42* (2013.01);
(Continued)

(58) Field of Classification Search
CPC .......... H01Q 1/243; H01Q 1/38; H01Q 21/28; H01Q 1/44
See application file for complete search history.

(56) References Cited

U.S. PATENT DOCUMENTS 4,099,184 A    7/1978   Rapshys
4,958,165 A    9/1990   Axford et al.
(Continued)

FOREIGN PATENT DOCUMENTS

CN    101207229    6/2008
CN    101529657    9/2009
(Continued)

OTHER PUBLICATIONS

Sakaguchi et al., "Comprehensive Calibration for MIMO System", Wireless Personal Multimedia Communications, 2005. The 5th International Symposium on, Oct. 30, 2002, vol. 2, pp. 440-443.
(Continued)

*Primary Examiner* — Graham P Smith
(74) *Attorney, Agent, or Firm* — Treyz Law Group, P.C.; G. Victor Treyz; Michael H. Lyons

(57) ABSTRACT

Electronic devices may be provided that contain wireless communications circuitry. The wireless communications circuitry may include radio-frequency transceiver circuitry and first and second antennas. An electronic device may include a housing. The first antenna may be located at an upper end of the housing and the second antenna may be located at a lower end of the housing. A peripheral conductive member may run around the edges of the housing and may be used in forming the first and second antennas. The radio-frequency transceiver circuitry may have a transmit-receive port and a receive port. Switching circuitry may connect the first antenna to the transmit-receive port and the second antenna to the receiver port or may connect the first antenna to the receiver port or may connect the first antenna
(Continued)

to the receive port and the second antenna to the transmit-receive port.

20 Claims, 8 Drawing Sheets

Related U.S. Application Data continuation of application No. 14/608,048, filed on Jan. 28, 2015, now Pat. No. 9,806,401, which is a continuation of application No. 12/941,011, filed on Nov. 5, 2010, now Pat. No. 8,947,302.

(51) Int. Cl.
| | | |
|---|---|---|
| H01Q 9/04 | (2006.01) | |
| H01Q 21/28 | (2006.01) | |
| H01Q 7/00 | (2006.01) | |
| H04B 1/401 | (2015.01) | |
| H04M 1/02 | (2006.01) | |
| H04B 7/06 | (2006.01) | |

(52) U.S. Cl.
CPC ........... *H01Q 21/28* (2013.01); *H04B 1/401* (2013.01); *H04M 1/0202* (2013.01); *H04B 7/0602* (2013.01); *H04B 7/0689* (2013.01)

(56) References Cited

U.S. PATENT DOCUMENTS

| | | | |
|---|---|---|---|
| 5,159,707 | A | 10/1992 | Mogi et al. |
| 5,768,691 | A | 6/1998 | Matero et al. |
| 6,021,317 | A | 2/2000 | Irvin |
| 6,339,400 | B1 | 1/2002 | Flint et al. |
| 6,373,439 | B1 | 4/2002 | Zurcher et al. |
| 6,560,443 | B1 | 5/2003 | Vaisanen et al. |
| 6,885,880 | B1 | 4/2005 | Ali |
| 7,155,178 | B2 | 12/2006 | Chang et al. |
| 7,176,838 | B1 | 2/2007 | Kinezos |
| 7,239,889 | B2 | 7/2007 | Saari et al. |
| 7,271,769 | B2 | 9/2007 | Asano et al. |
| 7,612,725 | B2 | 11/2009 | Hill et al. |
| 7,768,461 | B2 | 8/2010 | Cheng et al. |
| 8,781,420 | B2 | 7/2014 | Schlub et al. |
| 8,872,706 | B2 | 10/2014 | Caballero et al. |
| 2004/0192406 | A1 | 9/2004 | Okazaki et al. |
| 2004/0227674 | A1 | 11/2004 | Asano et al. |
| 2004/0257283 | A1 | 12/2004 | Asano et al. |
| 2005/0073462 | A1 | 4/2005 | Lin |
| 2005/0128155 | A1 | 6/2005 | Fukuda |
| 2005/0266904 | A1 | 12/2005 | Kitaki et al. |
| 2006/0001582 | A1 | 1/2006 | Hayashi |
| 2006/0017621 | A1 | 1/2006 | Okawara et al. |
| 2006/0109184 | A1 | 5/2006 | Chen et al. |
| 2007/0218853 | A1 | 9/2007 | Yu |
| 2008/0018541 | A1 | 1/2008 | Pang et al. |
| 2008/0150811 | A1 | 6/2008 | Honda et al. |
| 2008/0165063 | A1 | 7/2008 | Schlub et al. |
| 2008/0198087 | A1 | 8/2008 | Cheng et al. |
| 2008/0316115 | A1 | 12/2008 | Hill et al. |
| 2009/0143040 | A1 | 6/2009 | Man et al. |
| 2009/0256763 | A1 | 10/2009 | Chi et al. |
| 2009/0273529 | A1 | 11/2009 | Liu |
| 2010/0123632 | A1 | 5/2010 | Hill et al. |
| 2011/0014958 | A1 | 1/2011 | Black et al. |
| 2011/0241949 | A1 | 10/2011 | Nickel et al. |
| 2012/0009983 | A1 | 1/2012 | Mow et al. |
| 2012/0112970 | A1 | 5/2012 | Caballero et al. |
| 2012/0115553 | A1 | 5/2012 | Mahe et al. |

FOREIGN PATENT DOCUMENTS

| | | |
|---|---|---|
| CN | 101627537 | 1/2010 |
| CN | 202353552 | 7/2012 |
| EP | 1093098 | 4/2001 |
| EP | 1280230 | 1/2003 |
| EP | 1295358 | 3/2003 |
| EP | 1995889 | 11/2008 |
| JP | 2001185927 | 7/2001 |
| JP | 2001298378 | 10/2001 |
| JP | 2005175902 | 6/2005 |
| JP | 2005039696 | 10/2005 |
| JP | 2006527941 | 12/2006 |
| JP | 2008153984 | 3/2008 |
| JP | 2008159636 | 7/2008 |
| JP | 4425711 | 3/2010 |
| JP | 2010081098 | 4/2010 |
| JP | 2010531574 | 9/2010 |
| KR | 10-02009-0081415 | 7/2009 |
| TW | 200913370 | 3/2009 |
| WO | 2001059945 | 8/2001 |
| WO | 0191234 | 11/2001 |
| WO | 03096474 | 11/2003 |
| WO | 2004102744 | 11/2004 |
| WO | 2004-112187 | 12/2004 |
| WO | 2008055039 | 5/2008 |
| WO | 2010025023 | 3/2010 |

OTHER PUBLICATIONS

Mow et al., U.S. Appl. No. 12/831,180, filed Jul. 6, 2010.
Schlub et al., U.S. Appl. No. 12/759,243, filed Apr. 13, 2010.
Mahe et al., U.S. Appl. No. 12/941,008, filed Nov. 5, 2010.
Caballero et al., U.S. Appl. No. 12/941,010, filed Nov. 5, 2010.

| TX/RX MODE | ANTENNA | 850 TX | 850 RX | 900 TX | 900 RX | 1800 TX | 1800 RX | 1900 TX | 1900 RX | 2100 TX | 2100 RX | SWITCH POSITION |
|---|---|---|---|---|---|---|---|---|---|---|---|---|
| RX ONLY | UPPER ANTENNA MODE MA | L | (H) | | | | | | (H) | | | P1 |
| RX ONLY | UPPER ANTENNA MODE MB | | | L | (H) | L | (L) | | | M | (H) | P1 |
| TX/RX | LOWER ANTENNA | (H) | (H) | (H) | (H) | (H) | (H) | (H) | (H) | (H) | (H) | P1 |
| TX/RX | UPPER ANTENNA MODE MA | (L) | (H) | | | | | (L) | (H) | | | P2 |
| TX/RX | UPPER ANTENNA MODE MB | | (H) | | | (L) | (L) | | | (M) | | P2 |
| RX ONLY | LOWER ANTENNA | H | | H | | H | (H) | H | (H) | H | (H) | P2 |

FIG. 7

ANTENNA SYSTEM WITH ANTENNA SWAPPING AND ANTENNA TUNING

This application is a continuation of U.S. patent application Ser. No. 15/795,810, filed Oct. 27, 2017, which is a continuation of U.S. patent application Ser. No. 14/608,048, filed Jan. 28, 2015, which is a continuation of U.S. patent application Ser. No. 12/941,011, filed Nov. 5, 2010, now U.S. Pat. No. 8,947,302, which are hereby incorporated by reference herein in their entireties. This application claims the benefit of and claims priority to U.S. patent application Ser. No. 15/795,810, filed Oct. 27, 2017, U.S. patent application Ser. No. 14/608,048, filed Jan. 28, 2015 and U.S. patent application Ser. No. 12/941,011, filed Nov. 5, 2010.

BACKGROUND

This relates generally to wireless communications circuitry, and more particularly, to electronic devices that have wireless communications circuitry.

Electronic devices such as portable computers and cellular telephones are often provided with wireless communications capabilities. For example, electronic devices may use long-range wireless communications circuitry such as cellular telephone circuitry to communicate using cellular telephone bands at 850 MHz, 900 MHz, 1800 MHz, 1900 MHz, and 2100 MHz. Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz.

To satisfy consumer demand for small form factor wireless devices, manufacturers are continually striving to implement wireless communications circuitry such as antenna components using compact structures. At the same time, it may be desirable to include conductive structures in an electronic device such as metal device housing components. Because conductive components can affect radio-frequency performance, care must be taken when incorporating antennas into an electronic device that includes conductive structures. Moreover, care must be taken to ensure that the antennas and wireless circuitry in a device are able to operate satisfactorily even in areas of weak radio-frequency signal strength.

It would therefore be desirable to be able to provide improved wireless communications circuitry for wireless electronic devices.

SUMMARY

Electronic devices may be provided that contain wireless communications circuitry. The wireless communications circuitry may include radio-frequency transceiver circuitry and antenna structures. An electronic device may include a display mounted within a housing. A peripheral conductive member may run around the edges of the display and housing. The antenna structures may include first and second antennas. The first antenna may be located at an upper end of the housing and the second antenna may be located at a lower end of the housing.

The peripheral conductive member may be divided into individual segments by forming gaps in the peripheral conductive member at various points along its length. The gaps may be filled with a dielectric. The segments may be used in conjunction with an antenna ground plane to form the first and second antennas. For example, the first segment may be used in forming a two-branch inverted-F cellular telephone antenna in the upper end of the housing and the second segment may be used in forming a loop antenna in the lower end of the housing.

The loop antenna may be configured to cover five cellular telephone bands. The inverted-F antenna may be configured to cover fewer than five cellular telephone communications bands. A tunable matching circuit may be coupled to the inverted-F antenna and may be used to tune the inverted-F antenna to cover desired communications bands.

The electronic device may have radio-frequency transceiver circuitry that has a transmit-receive port and a receive port. Switching circuitry may connect the first antenna to the transmit-receive port and the second antenna to the receiver port or may connect the first antenna to the receive port and the second antenna to the transmit-receive port. Processing circuitry in the device may control the switching circuitry, the tunable matching circuit, and transmitter and receiver circuitry within the transceiver to ensure optimum operation in a variety of operating environments.

Further features of the invention, its nature and various advantages will be more apparent from the accompanying drawings and the following detailed description of the preferred embodiments.

BRIEF DESCRIPTION OF THE DRAWINGS

FIG. 7 is a chart showing how antennas of the type shown in FIG. 6 may be used in covering communications bands of interest by tuning a matching filter of the type shown in FIG. 5 and adjusting switching circuitry in accordance with an embodiment of the present invention.

DETAILED DESCRIPTION

Electronic devices may be provided with wireless communications circuitry. The wireless communications circuitry may be used to support wireless communications in multiple wireless communications bands. The wireless communications circuitry may include one or more antennas.

The antennas can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures. The conductive electronic device structures may include conductive housing structures. The housing structures may include a peripheral conductive member that runs around the periphery of an electronic device. The peripheral conductive member may serve as a bezel for a planar structure such as a display, may serve as sidewall structures for a device housing, or may form other housing structures. Gaps in the peripheral conductive member may be associated with the antennas.

Figure 1:
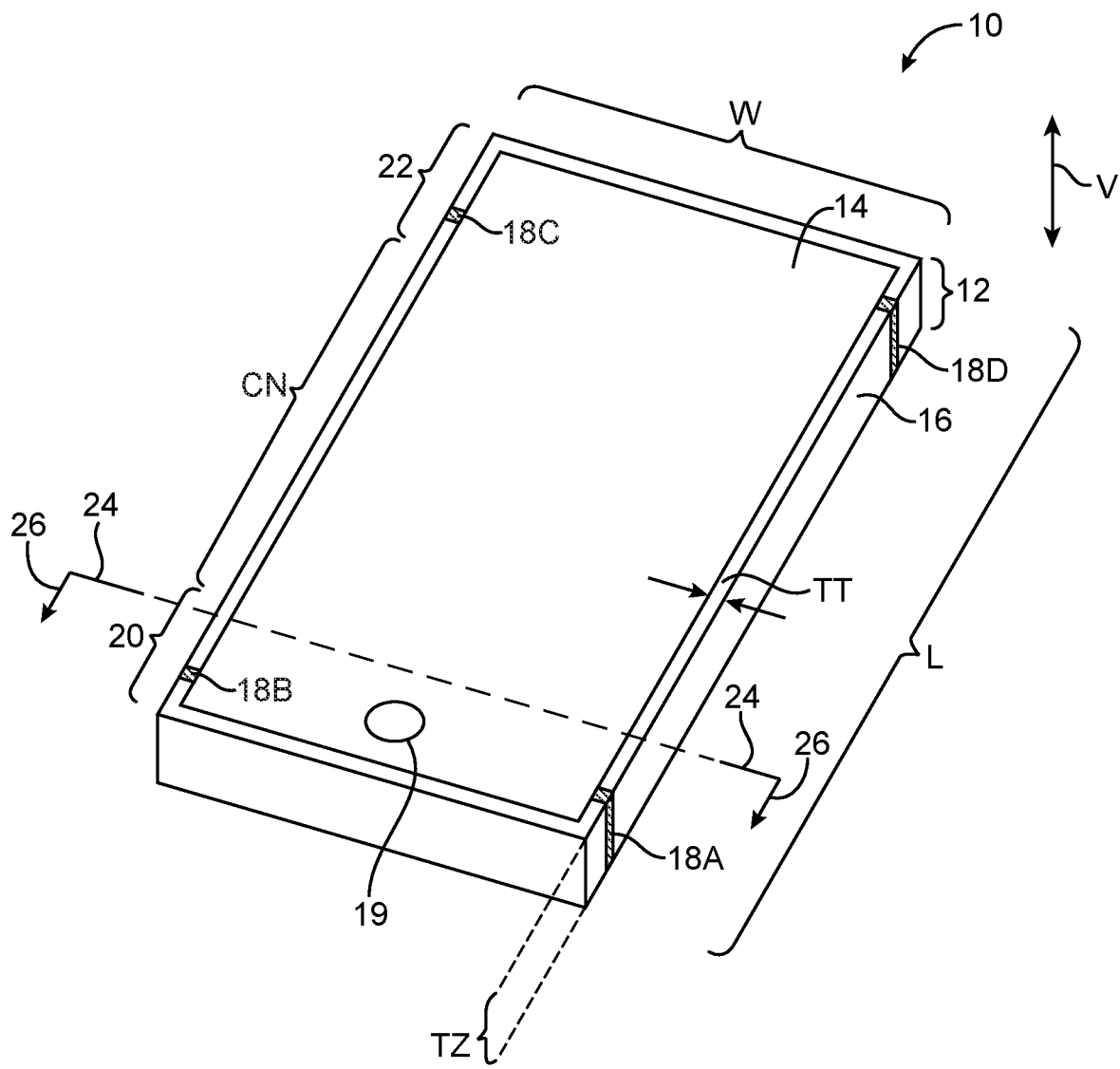
FIG. 1 is a perspective view of an illustrative electronic device with wireless communications circuitry in accordance with an embodiment of the present invention.

An illustrative electronic device of the type that may be provided with one or more antennas is shown in FIG. 1. Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, a media player, etc.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. Display 14 may, for example, be a touch screen that incorporates capacitive touch electrodes. Display 14 may include image pixels formed form light-emitting diodes (LEDs), organic LEDs (OLEDs), plasma cells, electronic ink elements, liquid crystal display (LCD) components, or other suitable image pixel structures. A cover glass layer may cover the surface of display 14. Buttons such as button 19 may pass through openings in the cover glass.

Housing 12 may include structures such as peripheral member 16. Member 16 may run around the rectangular periphery of device 10 and display 14. Member 16 or part of member 16 may serve as a bezel for display 14 (e.g., a cosmetic trim that surrounds all four sides of display 14 and/or helps hold display 14 to device 10). Member 16 may also, if desired, form sidewall structures for device 10.

Member 16 may be formed of a conductive material and may therefore sometimes be referred to as a peripheral conductive member or conductive housing structures. Member 16 may be formed from a metal such as stainless steel, aluminum, or other suitable materials. One, two, or more than two separate structures may be used in forming member 16. In a typical configuration, member 16 may have a thickness (dimension TT) of about 0.1 mm to 3 mm (as an example). The sidewall portions of member 16 may, as an example, be substantially vertical (parallel to vertical axis V). Parallel to axis V, member 16 may have a dimension TZ of about 1 mm to 2 cm (as an example). The aspect ratio R of member 16 (i.e., the ratio R of TZ to TT) is typically more than 1 (i.e., R may be greater than or equal to 1, greater than or equal to 2, greater than or equal to 4, greater than or equal to 10, etc.).

It is not necessary for member 16 to have a uniform cross-section. For example, the top portion of member 16 may, if desired, have an inwardly protruding lip that helps hold display 14 in place. If desired, the bottom portion of member 16 may also have an enlarged lip (e.g., in the plane of the rear surface of device 10). In the example of FIG. 1, member 16 has substantially straight vertical sidewalls. This is merely illustrative. The sidewalls of member 16 may be curved or may have any other suitable shape. In some configurations (e.g., when member 16 serves as a bezel for display 14), member 16 may run around the lip of housing 12 (i.e., member 16 may cover only the edge of housing 12 that surrounds display 14 and not the rear edge of the sidewalls of housing 12).

Display 14 may include conductive structures such as an array of capacitive electrodes, conductive lines for addressing pixel elements, driver circuits, etc. Housing 12 may include internal structures such as metal frame members, a planar housing member (sometimes referred to as a midplate) that spans the walls of housing 12 (i.e., a substantially rectangular member that is welded or otherwise connected between the opposing right and left sides of member 16), printed circuit boards, and other internal conductive structures. These conductive structures may be located in center CN of housing 12 (as an example).

In regions 22 and 20, openings may be formed between the conductive housing structures and conductive electrical components that make up device 10. These openings may be filled with air, plastic, or other dielectrics. Conductive housing structures and other conductive structures in region CN of device 10 may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, or may otherwise serve as part of antenna structures formed in regions 20 and 22.

Portions of member 16 may be provided with gap structures. For example, member 16 may be provided with one or more gaps such as gaps 18A, 18B, 18C, and 18D, as shown in FIG. 1. The gaps may be filled with dielectric such as polymer, ceramic, glass, etc. Gaps 18A, 18B, 18C, and 18D may divide member 16 into one or more peripheral conductive member segments. There may be, for example, two segments of member 16 (e.g., in an arrangement with two gaps), three segments of member 16 (e.g., in an arrangement with three gaps), four segments of member 16 (e.g., in an arrangement with four gaps, etc.). The segments of peripheral conductive member 16 that are formed in this way may form parts of antennas in device 10.

In a typical scenario, device 10 may have upper and lower antennas (as an example). An upper antenna may, for example, be formed at the upper end of device 10 in region 22. A lower antenna may, for example, be formed at the lower end of device 10 in region 20. The antennas may be used separately to cover separate communications bands of interest or may be used together to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
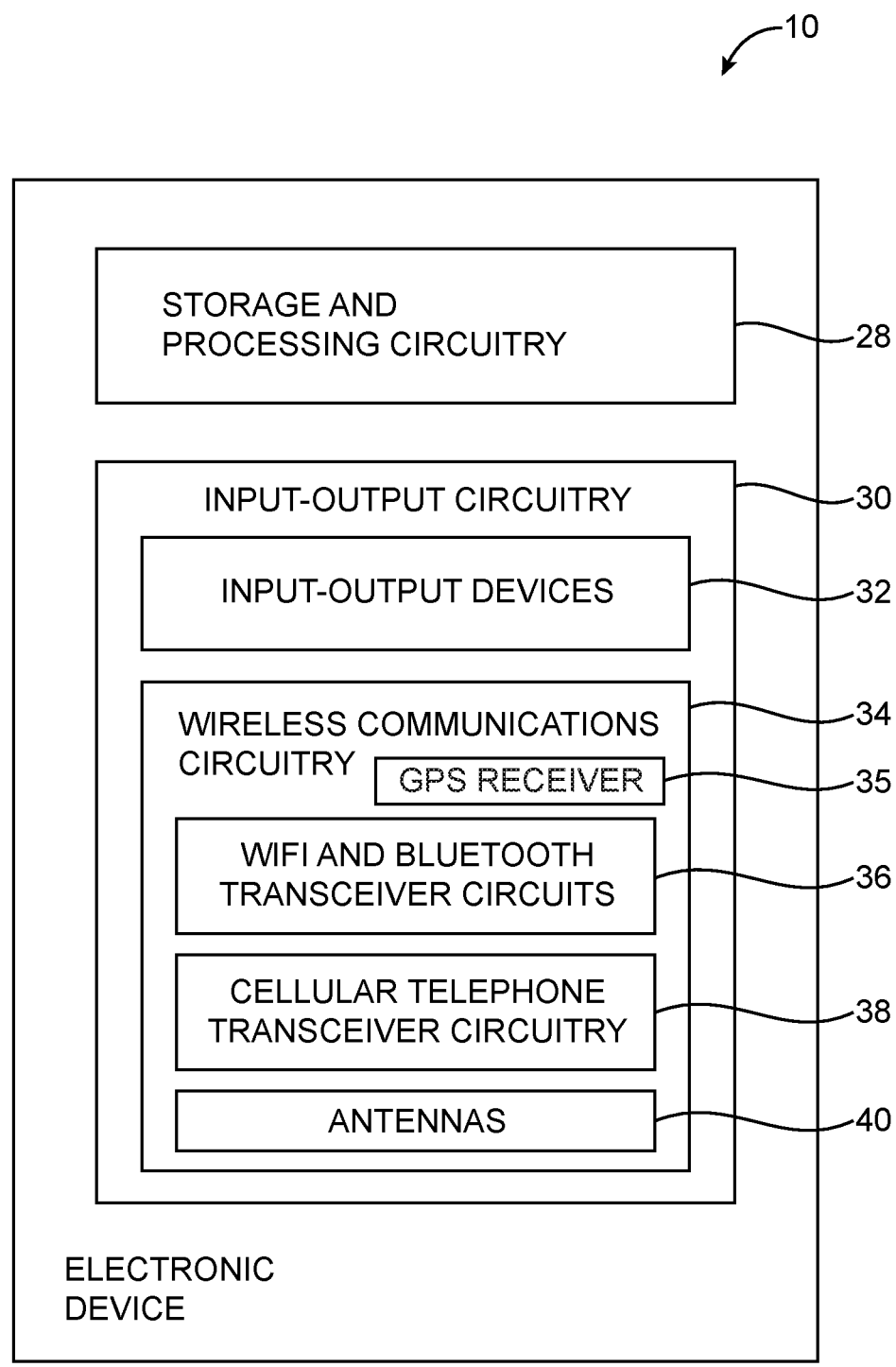
FIG. 2 is a schematic diagram of an illustrative electronic device with wireless communications circuitry in accordance with an embodiment of the present invention.

A schematic diagram of electronic device 10 is shown in FIG. 2. As shown in FIG. 2, electronic device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

Circuitry 28 may be configured to implement control algorithms that control the use of antennas in device 10. For example, to support antenna diversity schemes and MIMO schemes or other multi-antenna schemes, circuitry 28 may perform signal quality monitoring operations, sensor monitoring operations, and other data gathering operations and may, in response to the gathered data, control which antenna structures within device 10 are being used to receive and process data. As an example, circuitry 28 may control which of two or more antennas is being used to receive incoming radio-frequency signals, may control which of two or more antennas is being used to transmit radio-frequency signals, may control the process of routing data streams over two or more antennas in device 10 in parallel, etc. In performing these control operations, circuitry 28 may open and close switches, may turn on and off receivers and transmitters, may adjust impedance matching circuits, may configure switches in front-end-module (FEM) radio-frequency circuits that are interposed between radio-frequency transceiver circuitry and antenna structures (e.g., filtering and switching circuits used for impedance matching and signal routing), and may otherwise control and adjust the components of device 10.

Input-output circuitry 30 may be used to allow data to be supplied to device 10 and to allow data to be provided from device 10 to external devices. Input-output circuitry 30 may include input-output devices 32. Input-output devices 32 may include touch screens, buttons, joysticks, click wheels, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 32 and may receive status information and other output from device 10 using the output resources of input-output devices 32.

Wireless communications circuitry 34 may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 35 (e.g., for receiving satellite positioning signals at 1575 MHz). Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands at 850 MHz, 900 MHz, 1800 MHz, 1900 MHz, and 2100 MHz or other cellular telephone bands of interest. Wireless communications circuitry 34 can include circuitry for other short-range and long-range wireless links if desired. For example, wireless communications circuitry 34 may include global positioning system (GPS) receiver equipment, wireless circuitry for receiving radio and television signals, paging circuits, etc. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structure, patch antenna structures, inverted-F antenna structures, closed and open slot antenna structures, planar inverted-F antenna structures, helical antenna structures, strip antennas, monopoles, dipoles, hybrids of these designs, etc. Different types of antennas may be used for different bands and combinations of bands. For example, one type of antenna may be used in forming a local wireless link antenna and another type of antenna may be used in forming a remote wireless link antenna.

Figure 3:
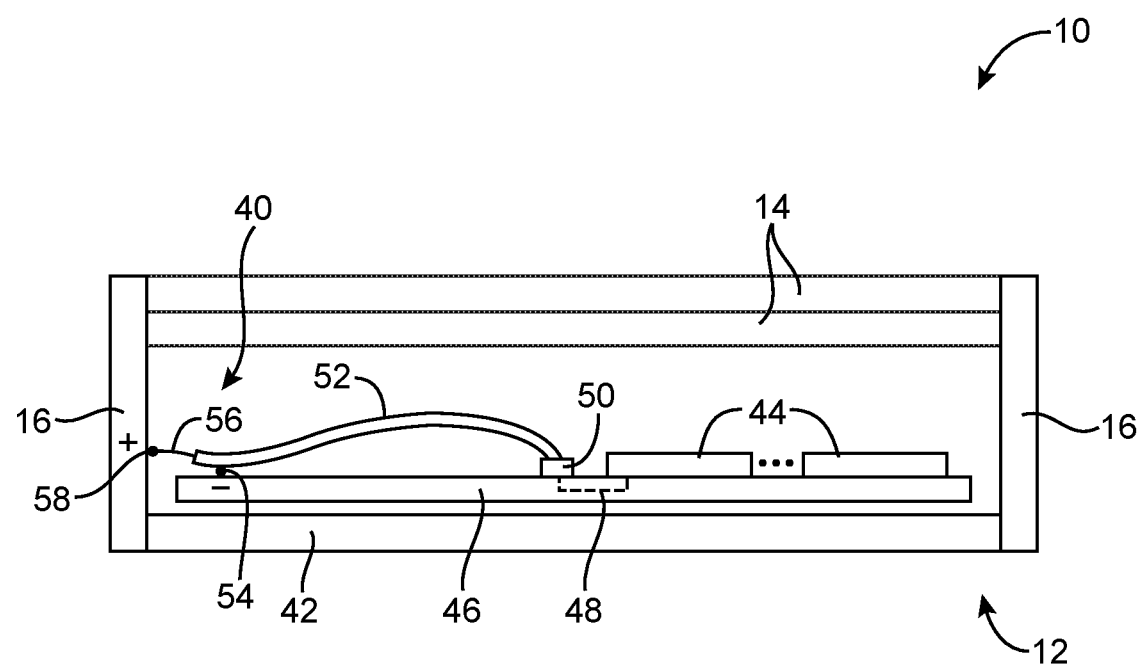
FIG. 3 is a cross-sectional end view of an illustrative electronic device with wireless communications circuitry in accordance with an embodiment of the present invention.

A cross-sectional side view of device 10 of FIG. 1 taken along line 24-24 in FIG. 1 and viewed in direction 26 is shown in FIG. 3. As shown in FIG. 3, display 14 may be mounted to the front surface of device 10. Housing 12 may include sidewalls formed from member 16 and one or more rear walls formed from structures such as planar rear housing structure 42. Structure 42 may be formed from a dielectric such as glass, ceramic, or plastic, and/or metals or other suitable materials (e.g., fiber composites). Snaps, clips, screws, adhesive, and other structures may be used in assembling the parts of housing 12 together.

Device 10 may contain printed circuit boards such as printed circuit board 46. Printed circuit board 46 and the other printed circuit boards in device 10 may be formed from rigid printed circuit board material (e.g., fiberglass-filled epoxy) or flexible sheets of material such as polymers. Flexible printed circuit boards ("flex circuits") may, for example, be formed from flexible sheets of polyimide.

Printed circuit board 46 (which may, if desired, be mounted on an internal housing member such as a metal plate) may contain interconnects such as interconnects 48. Interconnects 48 may be formed from conductive traces (e.g., traces of gold-plated copper or other metals). Connectors such as connector 50 may be connected to interconnects 48 using solder or conductive adhesive (as examples). Integrated circuits, discrete components such as resistors, capacitors, and inductors, and other electronic components may be mounted to printed circuit board 46.

Antennas in device 10 such as illustrative antenna 40 of FIG. 3 may have antenna feed terminals. For example, each antenna in device 10 may have a positive antenna feed terminal such as positive antenna feed terminal 58 and a ground antenna feed terminal such as ground antenna feed terminal 54. As shown in the illustrative arrangement of FIG. 3, a transmission line path such as coaxial cable 52 may be coupled between the antenna feed formed from terminals 58 and 54 and transceiver circuitry in components 44 via connector 50 and interconnects 48. Components 44 may include one or more integrated circuits for implementing wireless circuitry 34 of FIG. 2 (e.g., receiver 35 and transceiver circuits 36 and 38).

Connectors such as connector 50 may be used in coupling transmission lines in device 10 to printed circuit boards such as board 46. Connector 50 may be, for example, a coaxial cable connector that is connected to printed circuit board 46 using solder (as an example). Cable 52 may be a coaxial cable or other transmission line. Examples of transmission lines that may be used in device 10 include coaxial cables, microstrip and stripline transmission lines formed from a flex circuit or rigid printed circuit board, transmission lines that are formed from multiple transmission line structures such as these, etc.

When coupled to the feed of antenna 40, transmission line 52 may be used to transmit and receive radio-frequency signals using antenna 40. As shown in FIG. 3, terminal 58 may be coupled to coaxial cable center connector 56. Terminal 54 may be connected to a ground conductor in cable 52 (e.g., a conductive outer braid conductor). Other arrangements may be used for coupling transceivers in device 10 to antenna 40 if desired. For example, impedance matching circuits may be used in coupling transceiver circuitry to antenna structures. The arrangement of FIG. 3 is merely illustrative.

In the illustrative example of FIG. 3, device 10 includes antenna 40. To enhance signal quality and to cover multiple bands of interest, device 10 may contain multiple antennas. With one suitable arrangement, which is sometimes described herein as an example, a WiFi® antenna may be located in region 22, a first (e.g., a primary) cellular telephone antenna may be located in region 20, and a second (e.g., secondary) cellular telephone antenna may be located in region 22. The second cellular telephone antenna may, if desired, be configured to receive GPS signals.

The wireless circuitry of device 10 may be used to implement an antenna diversity scheme. The diversity scheme may support receiver diversity and/or transmitter diversity. For example, the wireless circuitry may include multiple receivers each of which is associated with a respective antenna or may contain a multiplexer that can be used to route signals from each of the antennas to a shared receiver (e.g., using a time multiplexing arrangement). Receiver diversity may be implemented to allow the receiver that is receiving the best antenna signal to be used. Switching circuitry may be included to allow the antennas to be swapped in real time. For example, if it is determined that a particular antenna is blocked during signal transmission operations, the switching circuitry can be used to connect the active transmitter circuit in the device to the antenna that is not blocked.

Figure 4:
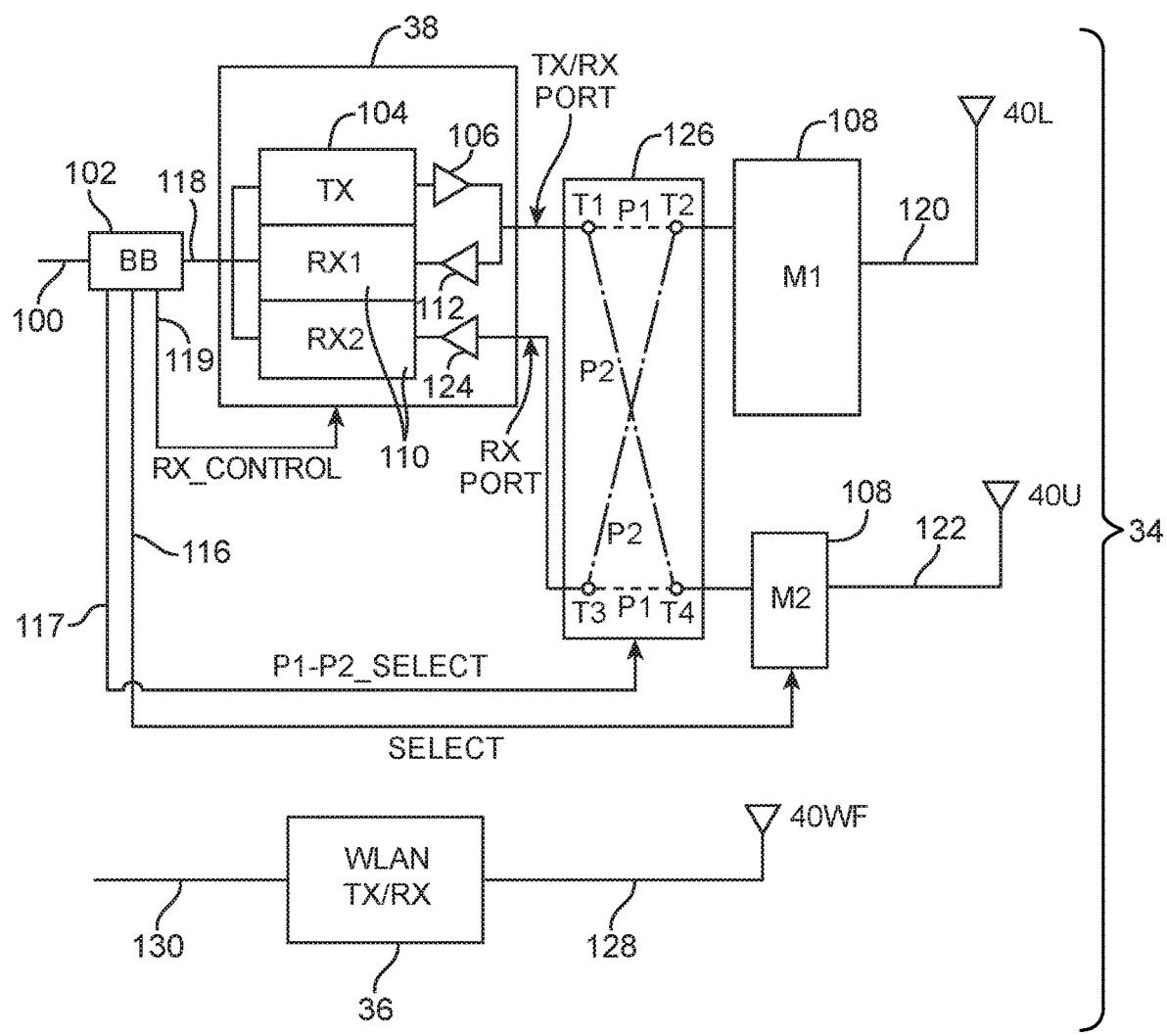
FIG. 4 is a diagram of illustrative wireless circuitry including multiple antennas in accordance with an embodiment of the present invention.

FIG. 4 is a circuit diagram of illustrative wireless circuitry 34 that may include resources for implementing receiver diversity and transmitter diversity in an electronic device with two cellular telephone antennas. In the example of FIG. 4, wireless circuitry 34 includes cellular telephone antenna 40L, cellular telephone antenna 40U, and wireless local area network antenna 40WF. Cellular telephone antenna 40L may be a lower cellular telephone antenna that is located at lower end 20 of device 10. Cellular telephone antenna 40U may be an upper cellular telephone antenna that is located at upper end 22 of device 10. If desired, additional antennas may be provided that support cellular telephone network communications. The illustrative arrangement of FIG. 4 in which there are two cellular antennas in wireless circuitry 34 is merely illustrative.

As shown in FIG. 4, wireless circuitry 34 may have input-output ports such as ports 100 and 130 for interfacing with digital data circuits in storage and processing circuitry 28. Wireless circuitry 34 may include one or more integrated circuits for implementing transceiver circuits such as baseband processor 102 and cellular telephone transceiver circuitry 38. Cellular telephone transceiver circuitry 38 may have a transmit-receive port (TX/RX port) and a receive port (RX port).

Port 100 may receive digital data from storage and processing circuitry 28 that is to be transmitted by transmitter 104 in transceiver circuitry 38. Incoming data that has been received by transceiver circuitry 38 and baseband processor 102 may be supplied to storage and processing circuitry 28 via port 100.

Port 130 may be used to handle digital data associated with transmitted and received wireless local area network signals such as WiFi® signals (as an example). Outgoing digital data that is supplied to port 130 by storage and processing circuitry 28 may be transmitted using wireless local area network transceiver circuitry 36, paths such as path 128, and one or more antennas such as antenna 40WF. During data reception operations, signals received by antenna 40WF may be provided to transceiver 36 via path 128. Transceiver 36 may convert the incoming signals to digital data. The digital data may be provided to storage and processing circuitry 28 via port 130. If desired, local signals such as Bluetooth® signals may also be transmitted and received via antennas such as antenna 40WF.

Transceiver circuitry 38 may include one or more transmitters and one or more receivers. Transceiver circuitry 38 may be coupled to antennas 40U and 40L using switching circuitry such as switch 126. The configuration of switch 126 may be controlled by control signal P1-P2_SELECT on path 117. Control circuitry in device 10 such as baseband processor 120 may control the state of signal P1-P2_SELECT to optimize antenna performance in real time.

As shown in FIG. 4, switch 126 may have four ports (terminals): T1, T2, T3, and T4. Switch 126 may have a first position (P1) and a second position (P2).

When P1-P2_SELECT has a first value, switch 126 will be placed in position P1. In this mode of operation, port T1 will be connected to port T2 and port T3 will be connected to port T4. When ports T1 and T2 are connected, outgoing signals from transceiver circuitry 38 will be passed to antenna 40L and incoming signals from antenna 40L will be passed to transceiver circuitry 38. When ports T3 and T4 are connected, incoming signals from antenna 40U will be passed to transceiver circuitry 38.

When P1-P2_SELECT has a second value, switch 126 will be placed in position P2. In this mode of operation, port T1 will be connected to port T4 and port T3 will be connected to port T2. When ports T1 and T4 are connected, outgoing signals from transceiver circuitry 38 will be passed to antenna 40U and incoming signals from antenna 40U will be passed to transceiver circuitry 38. When ports T3 and T2 are connected, incoming signals from antenna 40L will be passed to transceiver circuitry 38.

Transmitter 104 and receivers 110 (i.e., receiver RX1 and receiver RX2) may be used to handle cellular telephone communications. Signals that are received by transmitter 104 over path 118 may be supplied to power amplifier 106 by transmitter 104. Power amplifier 106 may strengthen these outgoing signals for transmission through port T1 (and thereafter over antenna 40L or antenna 40U, depending on the state of switch 126). Incoming signals that are provided to port T1 (i.e., from antenna 40L or antenna 40U depending on the state of switch 126) may be amplified using low noise amplifier 112. Signals received by low noise amplifier 112 may be provided to receiver RX1. Receiver RX1 may provide received data to processor 102 via path 118. Incoming signals that are provided to port T3 (i.e., from antenna 40L or antenna 40U depending on the state of switch 126) may be amplified using low noise amplifier 124. Signals received by low noise amplifier 124 may be provided to receiver RX2. Receiver RX2 may provide received data to processor 102 via path 118. Circuits such as transmitter 104 and receivers 110 may each have multiple ports (e.g., for handling different respective communications bands) and may be implemented using one or more individual integrated circuits.

Antennas 40U and 40L may be coupled to transceiver circuitry 38 using circuitry such as impedance matching circuitry, filters, and switches (e.g., switch 126). This circuitry, which is sometimes referred to as front-end module (FEM) circuitry, can be controlled by storage and processing circuitry in device 10 (e.g., control signals from a processor such as baseband processor 102). As shown in the example of FIG. 4, the front-end circuitry in wireless circuitry 34 may include impedance matching circuitry 108 such as matching circuit M1 and matching circuit M2. Impedance matching circuitry 108 may be formed using conductive structures with associated capacitance, resistance, and inductance values, and/or discrete components such as inductors, capacitors, and resistors that form circuits to match the impedances of transceiver circuitry 38 and antennas 40U and 40L. Matching circuit M1 may be coupled between wireless transceiver circuitry 38 (including associated its amplifier circuitry and switching circuitry 126) and antenna 40L. Matching circuit M2 may be coupled between transceiver circuitry 38 (and its associated amplifier circuitry and switching circuitry 126) and antenna 40U. Paths such as paths 120 and 122 may be used to couple matching circuitry 108 to antennas 40L and 40U.

Matching circuits M1 and M2 may be fixed or adjustable. For example, matching circuit M1 may be fixed and matching circuit M2 may be adjustable. In this type of configuration, a control circuit such as baseband processor 102 may issue control signals such as signal SELECT on path 116 during operation of wireless circuitry 34. Signal SELECT may be distributed to matching circuit M2. When SELECT has a first value, matching circuit M2 may be placed in a first configuration. When SELECT has a second value, matching circuit M2 may be placed in a second configuration. The state of matching circuit M2 may serve to tune antenna 40U so that different communications bands are covered by antenna 40U.

Figure 5:
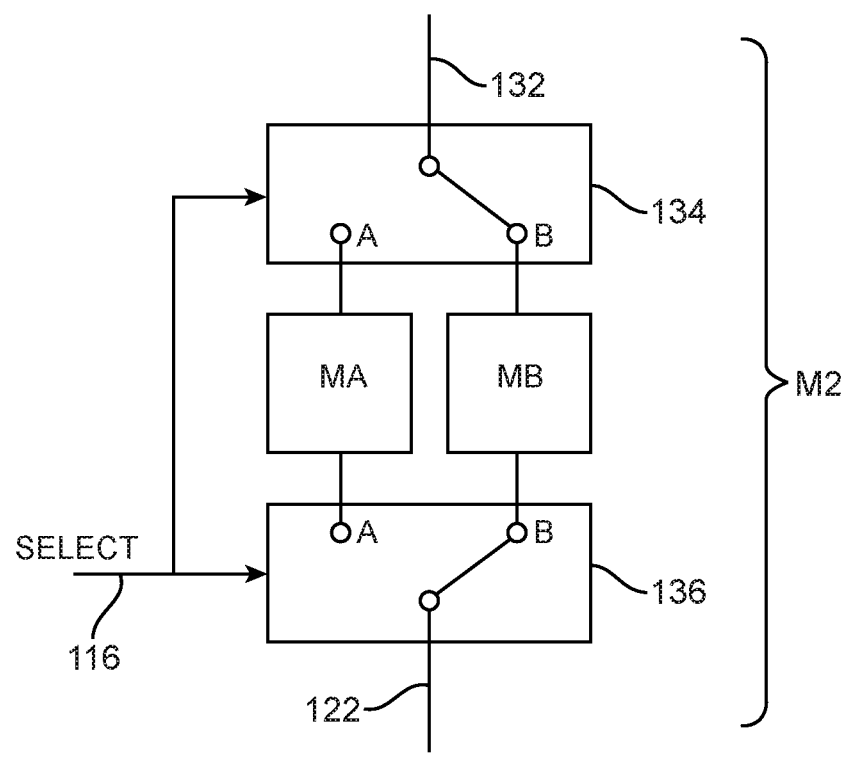
FIG. 5 is a circuit diagram of an illustrative tunable matching circuit of the type that may be used in connection with the wireless circuitry of FIG. 4 in accordance with an embodiment of the present invention.

Illustrative tunable circuitry that may be used for implementing matching circuit M2 of FIG. 4 is shown in FIG. 5. As shown in FIG. 5, matching circuit M2 may have switches such as switches 134 and 136. Switches 134 and 136 may have multiple positions (shown by the illustrative A and B positions in FIG. 5). When signal SELECT has a first value, switches 134 and 136 may be put in their A positions and matching circuit MA may be switched into use. When signal SELECT has a second value, switches 134 and 136 may be placed in their B positions (as shown in FIG. 5), so that matching circuit MB is connected between paths 132 and 122.

By adjusting matching circuit M2, the frequency response of antenna 40U may be tuned as needed. For example, antenna 40U may be placed in one configuration when it is desired to cover a set of communications bands that are commonly used in a one country and may be placed in another configuration when it is desired to cover a set of communications bands that are commonly used in another country.

In wireless circuitry with tunable matching circuitry such as circuitry 34 of FIG. 4, antenna 40U may be able to cover a wider range of communications frequencies than would otherwise be possible. The use of tuning for antenna 40U may therefore allow a relatively narrow bandwidth (and potentially compact) design to be used for antenna 40U, if desired.

As shown in FIG. 4, control signals such as RX_CONTROL may be provided to receiver circuitry 110 using a path such as path 119. Using these control signals, wireless circuitry 34 can selectively activate receivers RX1 and RX2 or can otherwise select which incoming antenna signals are being received.

The operation of device 10 may involve real time control of switching circuitry such as switching circuitry 126, transceiver circuitry 38 (e.g., receiver circuitry 110), and matching circuitry such as matching circuitry 108. Antennas 40U and 40L may be implemented using structures that cover the same sets of communications bands or that cover different but overlapping sets of communications bands.

Antenna 40L may be located at the lower end of device housing 12, whereas antenna 40U may be located at the upper end of device housing 12. In this type of configuration, antenna 40L will tend to be located farther from the head of a user during operation of device 10 (e.g., when device 10 is a handheld device such as a cellular telephone and is used in the orientation shown in FIG. 1). Because of its location, it may be possible to increase transmitter power levels more when using antenna 40L to transmit radio-frequency signals than when using antenna 40U to transmit radio-frequency signals, while satisfying regulatory limits on emitted radiation such as specific absorption rate (SAR) limits. Antenna 40L may also cover more bands and/or may be more efficient in certain bands than antenna 40U. Because of considerations such as these, antenna 40L may sometimes be referred to as being the primary antenna for device 10 and antenna 40U may sometimes be referred to as being the secondary antenna for device 10.

Transceiver port TX/RX may sometimes be referred to as forming a transmit-receive port, because port TX/RX (and associated switch port T1) handles transmitted signals from transmitter 104 and received signals associated with receiver RX1. Transceiver port RX may sometimes be referred to as forming a receive port (receive-only port), because port RX (and associated switch port T3) are used in providing received signals to receiver RX2.

During operation, processing circuitry in device 10 such as baseband processor 102 can adjust signals P1-P2_SELECT, RX_CONTROL, and SELECT or other suitable control signals in real time so that overall antenna performance is optimized, even as the performance of each individual antenna varies due to environmental factors. Examples of factors that may influence antenna performance include the position of device 10 relative to the user's body and the surrounding environment, the orientation of each antenna relative to its surroundings, and other factors that influence signal losses in the respective paths between each antenna and the remote cellular telephone base station equipment with which device 10 is communicating.

To determine how wireless circuitry 34 should be configured, processing circuitry such as baseband processor 102 may monitor signal quality for each antenna. For example, processor 102 may determine received signal quality as reflected by received signal metrics such a bit error rate, frame error rate, signal to noise ratio, other noise values, fraction of dropped packets, received signal strength, etc. Transmitted signal quality for an antenna may be inferred from received signal quality using the same antenna or may be determined based on information on cell-tower-specified transmit powers, information on transmitted signal quality that is received from an associate base station, etc. Signal quality information may be gathered for antennas 40L and 40U by periodically switching between antennas 40L and 40U (e.g., when sharing a receiver) or by using receiver RX1 to measure signals from one antenna while using receiver RX2 to measure signals from the other antenna.

Sensor data may also be monitored. For example, device 10 may be provided with proximity sensors or other circuitry that is able to ascertain whether each antenna is being blocked (e.g., by an external object such as a part of a user's body, etc.). Data from one or more proximity sensors may be monitored by processor 102 to determine whether corresponding antennas that are located adjacent to the proximity sensors are being adversely affected by the presence of the external object.

Whenever data from a sensor, data from a cellular network, and/or data that device 10 has gathered on received signal quality or other data indicates that the performance of a particular antenna is not acceptable, processor 102 can adjust wireless circuitry 34 in real time to optimize antenna performance.

Consider, as an example, a situation in which it is determined that antenna 40L is performing better than antenna 40U (e.g., because antenna 40U is partially blocked by an external object and/or because antenna 40L is more efficient than antenna 40U). In this situation, switch 126 may be placed in position P1. In this configuration, the TX/RX port and port T1 of switch 126 will be coupled to antenna 40L, so antenna 40L may be used for transmit and receive operations associated with the TX/RX port and port T1. Receiver RX2 may monitor signal quality for antenna 40U using the RX port of transceiver circuitry 38.

If received signals from antenna 40L drop in quality relative to received signals from antenna 40U or if other suitable criteria are satisfied, the antenna assignments in wireless circuitry 34 can be swapped by placing switch 126 in position P2. In this configuration, the TX/RX port of transceiver circuitry 38 will be coupled to antenna 40U and signals from the TX/RX port can be transmitted and received through antenna 40U. The receive port of transceiver circuitry 38 can be used to monitor signal quality for antenna 40L. If signal quality with antenna 40U remains high (as indicated by received signal monitoring data gathered from antennas 40U and 40L using receivers RX1 and RX2, sensor data, or other information), switch 126 can be maintained in position P2. If, however, processor 102 determines that signal quality would be better if signals were handled by antenna 40L, switch 126 can be returned to position P1.

If desired (e.g., when implementing MIMO schemes), multiple receiver ports may be simultaneously used to handle independent streams of data each of which is associated with a respective antenna.

Figure 6:
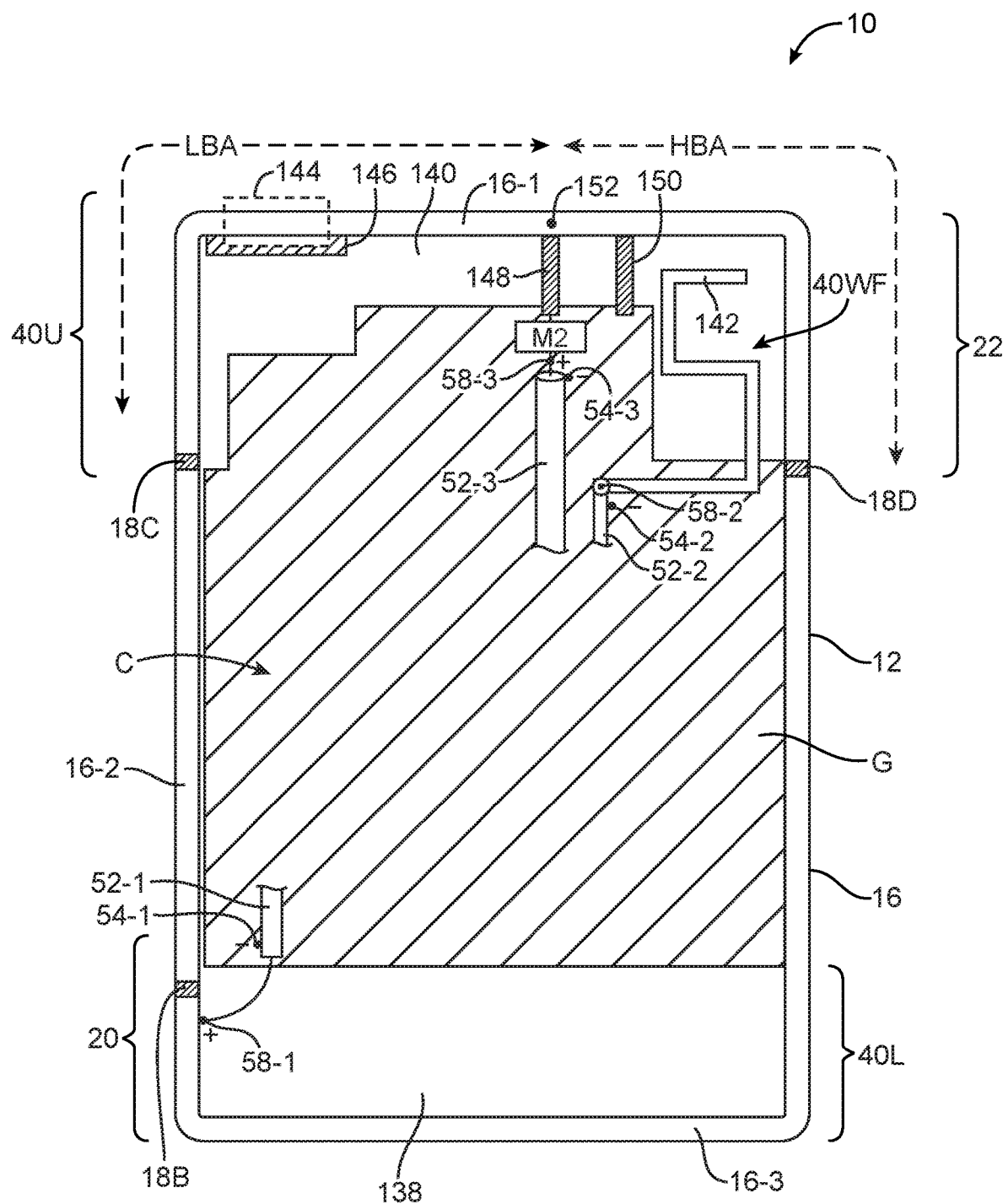
FIG. 6 is a diagram of an electronic device of the type shown in FIG. 1 showing how antennas may be formed within the device in accordance with an embodiment of the present invention.

FIG. 6 is a top view of the interior of device 10 showing how antennas 40L, 40U, and 40WF may be implemented within housing 12. As shown in FIG. 6, ground plane G may be formed within housing 12. Ground plane G may form antenna ground for antennas 40L, 40U, and 40WF. Because ground plane G may serve as antenna ground, ground plane G may sometimes be referred to as antenna ground, ground, or a ground plane element (as examples).

In central portion C of device 10, ground plane G may be formed by conductive structures such as a conductive housing midplate member that is connected between the left and right edges of member 16, printed circuit boards with conductive ground traces, etc. At ends 22 and 20 of device 10, the shape of ground plane G may be determined by the shapes and locations of conductive structures that are tied to ground. Examples of conductive structures that may overlap to form ground plane G include housing structures (e.g., a conductive housing midplate structure, which may have protruding portions), conductive components (e.g., switches, cameras, data connectors, printed circuits such as flex circuits and rigid printed circuit boards, radio-frequency shielding cans, buttons such as button 144 and conductive button mounting structure 146, etc.), and other conductive structures in device 10. In the illustrative layout of FIG. 6, the portions of device 10 that are conductive and tied to ground to form part of ground plane G are shaded and are contiguous with central portion C.

Openings such as openings 138 and 146 may be formed between ground plane G and respective portions of peripheral conductive member 16. Openings 138 and 146 may be filled with air, plastic, and other dielectrics. Openings 138 and 146 may be associated with antenna structures 40.

Lower antenna 40L may be formed by a loop antenna structure having a shape that is determined at least partly by the shape of the lower portions of ground plane G and conductive housing member 16. In the example of FIG. 6, opening 138 is depicted as being rectangular, but this is merely illustrative. In practice, the shape of opening 138 may be dictated by the placement of conductive structures in region 20 such as a microphone, flex circuit traces, a data port connector, buttons, a speaker, etc.

Lower antenna 40L may be fed using an antenna feed made up of positive antenna feed terminal 58-1 and ground antenna feed terminal 54-1. Transmission line 52-1 (see, e.g., path 122 of FIG. 4) may be coupled to the antenna feed for lower antenna 40L. Gap 18B may form a capacitance that helps configure the frequency response of antenna 40L. If desired, device 10 may have conductive housing portions, matching circuit elements, and other structures and components that help match the impedance of transmission line 52-1 to antenna 40L (see, e.g., illustrative matching circuit M1 of FIG. 4).

Antenna 40WF may have an antenna resonating element formed from a strip of conductor such as strip 142. Strip 142 may be formed from a trace on a flex circuit, from a trace on a rigid printed circuit board, from a strip of metal foil, or from other conductive structures. Antenna 40WF may be fed by transmission line 52-2 (see, e.g., path 128 of FIG. 4) using antenna feed terminals 58-2 and 54-2.

Antenna 40U may be a two-branch inverted-F antenna. Transmission line 52-3 (see, e.g., path 120 of FIG. 4) may be used to feed antenna 40U at antenna feed terminals 58-3 and 54-3. Conductive structure 150 may be bridge dielectric opening 140 and may be used to electrically short ground plane G to peripheral housing member 16. Conductive structure 148 and matching circuit M2 may be used to connect antenna feed terminal 58-3 to peripheral conductive member 16 at point 152. Conductive structures such as structures 148 and 150 may be formed by flex circuit traces, conductive housing structures, springs, screws, or other conductive structures.

Gaps such as gaps 18B, 18C, and 18D may be present in peripheral conductive member 16. (Gap 18A of FIG. 1 may be absent or may be implemented using a phantom gap structure that cosmetically looks like a gap from the exterior of device 10, but that is electrically shorted within the interior of housing 12 so that no gap is electrically present in the location of gap 18A.) The presence of gaps 18B, 18C, and 18D may divide peripheral conductive member 16 into segments. As shown in FIG. 6, peripheral conductive member 16 may include first segment 16-1, second segment 16-2, and third segment 16-3.

Segment 16-1 may form antenna resonating element arms for antenna 40U. In particular, a first portion (segment) of segment 16-1 (having arm length LBA) may extend from point 152 (where segment 16-1 is fed) to the end of segment 16-1 that is defined by gap 18C and a second portion (segment) of segment 16-1 (having arm length HBA) may extend from point 152 to the opposing end of segment 16-1 that is defined by gap 18D. The first and second portions of segment 16-1 may form respective branches of an inverted F antenna and may be associated with respective low band (LB) and high band (HB) antenna resonances for antenna 40U.

Antenna 40L may, as an example, cover the transmit and receive sub-bands in five communications bands (e.g., 850 MHz, 900 MHz, 1800 MHz, 1900 MHz, and 2100 MHz). Antenna 40U may be configured to cover these same five communications bands or may be configured to cover a subset of the bands covered by antenna 40L.

A table showing illustrative bands that may be covered by antennas 40U (e.g., the upper antenna in device 10 at upper end 22 of housing 12) and 40L (e.g., the lower antenna in device 10 at lower end 20 of housing 12) as a function of the state of matching circuit M2 (i.e., state MA or MB) and as a function of the position of switch 126 are shown in FIG. 7.

The rightmost column of the table of FIG. 7 indicates the position of switch 126 (P1 or P2) and the leftmost column of the table of FIG. 7 indicates the resulting transmit and receive mode for wireless circuitry 34. Each row in the column contains entries that specify how well the antenna listed in the second-to-leftmost column handles various communications bands. Entries marked with "H" indicate that a band is covered. Entries marked with an "L" indicate that a band is covered less efficiently than for an "H" entry. Entries marked with an "M" indicate that a band is covered with more efficiency than an "L" entry, but with less efficiency than for an "H" entry. Blank cells correspond to bands that are not covered. The circled entries indicate which of the covered bands are used for each antenna when operated using wireless circuitry 34 of FIG. 4.

When switch 126 is in position P1, the TX/RX port of transceiver circuitry 38 (i.e., the port of circuitry 38 that is coupled to switch port T1) will be coupled to lower antenna 40L and upper antenna 40U will function as a "receive-only" antenna that feeds signals to receiver RX2 (e.g., for signal quality monitoring), as indicated by the top three rows of the FIG. 7 table. The state of matching circuit M2 (as controlled by signal SELECT) will determine whether upper antenna 40U functions in mode MA (the first row of the table) or mode MB (the second row of the table). As shown in the table, in the MA mode, the upper antenna can be used to receive signals in the 850 RX band (the 850 MHz receive band) and 1900 RX band (the 1900 receive band). In the MB mode, the upper antenna can be used to receive signals in the 900 RX band, the 1800 RX band, and the 2100 RX band. The lower antenna can be used to transmit and receive in all five listed cellular telephone communications bands (850 MHz, 900 MHz, 1800 MHz, 1900 MHz, and 2100 MHz).

When switch 126 is in position P2, the TX/RX port of transceiver circuitry 38 will be coupled to upper antenna 40U and lower antenna 40L will function as a "receive-only" antenna that feeds signals to receiver RX2 (e.g., for signal quality monitoring), as indicated by the bottom three rows of the FIG. 7 table. The state of matching circuit M2 will determine whether upper antenna 40U functions in mode MA (the fourth row of the table) or mode MB (the fifth row of the table). As shown in the table, in the MA mode, the upper antenna can be used to transmit signals in the 850 TX and 1900 TX bands and can receive signals in the 850 RX and 1900 RX bands. In the MB mode, the upper antenna can be used to transmit signals in the 900 TX, 1800 TX, and 2100 TX bands and can receive signals in the 900 RX band, the 1800 RX band, and the 2100 RX band. When switch 126 is in position P2, the lower antenna can be used to receive signals (e.g., to monitor signal quality) in all five listed cellular telephone communications bands (850 MHz, 900 MHz, 1800 MHz, 1900 MHz, and 2100 MHz).

Antenna structures with different band coverage than the coverage listed in the FIG. 7 table may be used in device 10 if desired. The antenna responses of the FIG. 7 table are merely illustrative.

Figure 8:
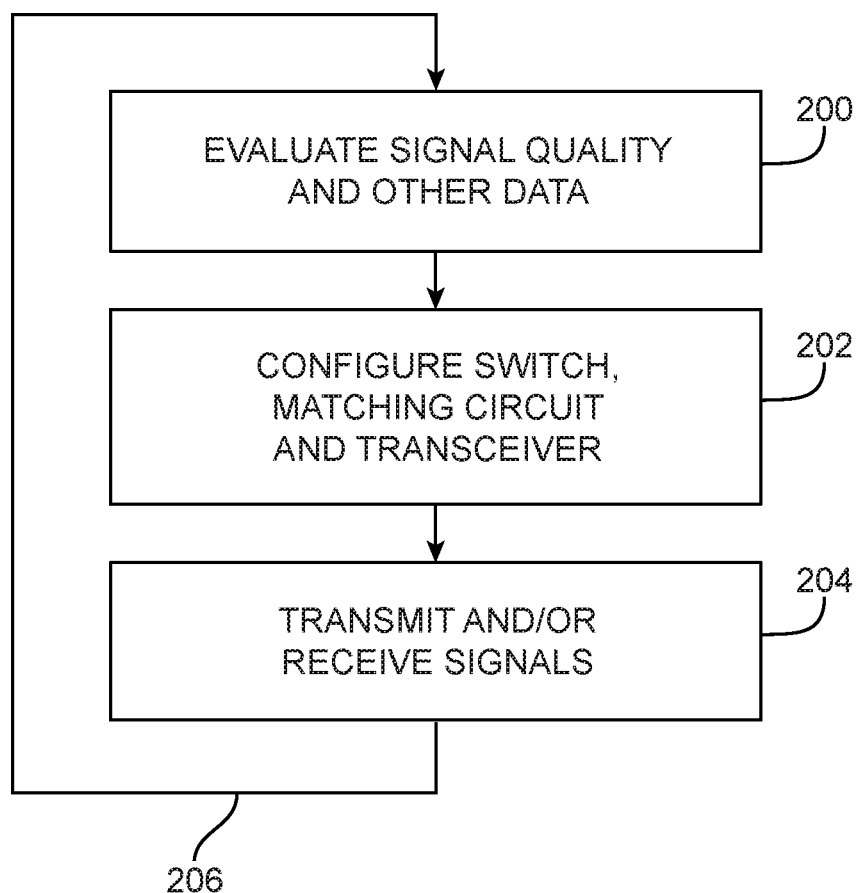
FIG. 8 is a flow chart showing illustrative steps involved in operating an electronic device of the type shown in FIG. 1 that includes wireless circuitry of the type shown in FIG. 4 in accordance with an embodiment of the present invention.

Illustrative steps involved in operating device 10 using wireless circuitry such as wireless circuitry 34 of FIG. 4 are shown in FIG. 8. As step 200, device 10 may gather information on the performance of antenna 40L and antenna 40U. For example, signal quality metrics such as bit error rate, frame error rate, signal strength, noise, or other indicators of received quality may be measured and information on the quality of transmitted signals may be gathered (e.g., using feedback from a cellular network). Data from proximity sensors may also be evaluated to determine whether antenna performance is being affected (or is likely being affected). The data that is gathered during the operations of step 200 may be evaluated (e.g., using storage and processing circuitry 28 such as baseband processor 102) to determine how to optimally adjust wireless circuitry 34.

During the operations of step 202, in response to the information on the performance of antennas 40L and 40U that was obtained during step 200, wireless circuitry 34 may be configured in real time. For example, if it is determined that an adjustment to switch 126 will result in improved antenna performance for transmitting signals, switch 126 may be adjusted accordingly. Matching circuit adjustments to matching circuit M2 may be made to ensure that upper antenna 40U covers desired bands of interest (e.g., depending on the country in which device 10 is located).

During the operations of step 204, the optimal settings that were selected at step 202 may be used to operate wireless circuitry 34 and device 10. Periodically, or in response to satisfaction of predetermined criteria, control may loop back to step 200 as indicated by line 206. Upon returning to step 200, updated antenna performance data may be obtained and evaluated to determine whether further adjustments to the configuration of wireless circuitry 34 should be made.

The foregoing is merely illustrative of the principles of this invention and various modifications can be made by those skilled in the art without departing from the scope and spirit of the invention.

What is claimed is:

1. An electronic device, comprising:
   a housing having peripheral conductive housing structures that run around at least first, second, third, and fourth edges of the housing, wherein the first edge opposes the third edge and the second edge opposes the fourth edge;
   an antenna ground, wherein the antenna ground is formed at least partly from conductive portions of the housing;
   a first dielectric-filled gap in the peripheral conductive housing structures along the first edge of the housing;
   a second dielectric-filled gap in the peripheral conductive housing structure along the third edge of the housing; and
   an antenna that includes the antenna ground, an antenna resonating element arm formed from a segment of the peripheral conductive housing structures extending from the first dielectric-filled gap to the second dielectric-filled gap, and an antenna feed coupled to the segment of the peripheral conductive housing structures and the antenna ground.

2. The electronic device defined in claim 1, further comprising:
   a third dielectric-filled gap in the peripheral conductive housing structures along the first edge of the housing; and
   a fourth dielectric-filled gap in the peripheral conductive housing structures along the third edge of the housing.

3. The electronic device defined in claim 2, wherein a first additional segment of the peripheral conductive housing structures extending between the first and third dielectric-filled gaps and a second additional segment of the peripheral conductive housing structures extending between the second and fourth dielectric-filled gaps form part of the antenna ground.

4. The electronic device defined in claim 1, wherein the electronic device has a length, a width that is less than the length, and a height that is less than the width, and the peripheral conductive housing structures and the first and second dielectric-filled gaps each extend across the height of the electronic device.

5. The electronic device defined in claim 4, further comprising:
   a display that forms a front face of the electronic device and extends across the length and the width of the electronic device.

6. The electronic device defined in claim 5, wherein the housing comprises a rear housing wall that forms a rear face of the electronic device.

7. The electronic device defined in claim 6, wherein the rear housing wall comprises a conductive rear housing wall.

8. The electronic device defined in claim 6, wherein the rear housing wall comprises glass and metal.

9. The electronic device defined in claim 5, further comprising:
   a planar conductive layer that forms a portion of the antenna ground, that extends from the first edge to the third edge of the housing, and that is separated from the segment of the peripheral conductive housing structures by a slot, wherein the antenna feed is coupled across the slot.

10. The electronic device defined in claim 9, further comprising:
    a glass structure that forms a rear face of the electronic device and extends between the peripheral conductive housing structures.

11. The electronic device defined in claim 1, wherein the segment of the peripheral conductive structures comprises a first portion that runs along the first edge of the housing and that defines an edge of the first dielectric-filled gap, a second portion that runs along the second edge of the housing, and a third portion that runs along the third edge of the housing and defines an edge of the second dielectric-filled gap.

12. An electronic device having a periphery, comprising:
    a housing having peripheral conductive structures that run around the periphery of the electronic device;
    a first dielectric-filled gap in the peripheral conductive structures that separates a first segment of the peripheral conductive structures from a second segment of the peripheral conductive structures;
    a second dielectric-filled gap in the peripheral conductive structures that separates the first segment of the peripheral conductive structures from a third segment of the peripheral conductive structures; and
    a conductive layer that extends from the second segment of the peripheral conductive structures to the third segment of the peripheral conductive structures, wherein the first segment of the peripheral conductive structures is separated from the conductive layer by a slot, and the first, second, and third segments of the peripheral conductive structures form antenna structures for an antenna in the electronic device.

13. The electronic device defined in claim 12, wherein the first segment of the peripheral conductive structures has a first portion that extends along a first side of the periphery, a second portion that extends along a second side of the periphery, and a third portion that extends along a third side of the periphery.

14. The electronic device defined in claim 13, wherein the second segment of the peripheral conductive structures runs along the second side of the periphery and the third segment of the peripheral conductive structures runs along the third side of the periphery.

15. The electronic device defined in claim 14, wherein the electronic device has a length, a width that is less than the length, and a height that is less than the width, the first segment of the peripheral conductive structures extends across the width, and the first, second, and third segments of the peripheral conductive structures and the first and second dielectric-filled gaps each extend across the height of the electronic device.

16. The electronic device defined in claim 12, further comprising:
    a display that forms a first face of the electronic device and that extends between the first, second, and third segments of the peripheral conductive structures; and
    a glass structure that forms a second face of the electronic device opposite the first face and that extends between the first, second, and third segments of the peripheral conductive structures.

17. An electronic device having a periphery and comprising:
    a housing having peripheral conductive structures that run around the periphery of the electronic device;
    a display that is mounted to the peripheral conductive structures and that forms a front face of the electronic device;
    a glass structure that is mounted to the peripheral conductive structures and that forms a rear face of the electronic device;
    a first dielectric-filled gap in the peripheral conductive structures; and a second dielectric-filled gap in the peripheral conductive structures, wherein the peripheral conductive structures comprise a segment extending from the first dielectric-filled gap to the second dielectric-filled gap, the segment forming antenna structures for an antenna in the electronic device.

18. The electronic device defined in claim 17, further comprising:
a planar conductive structure extending across a width of the electronic device, wherein the planar conductive structure forms part of the antenna.

19. The electronic device defined in claim 17, further comprising:
a third dielectric-filled gap in the peripheral conductive structures, wherein the first and third dielectric-filled gaps are formed along a first edge of the periphery; and
a fourth dielectric-filled gap in the peripheral conductive structures, wherein the second and fourth dielectric-filled gaps are formed along a second edge of the periphery opposite the first edge.

20. The electronic device defined in claim 19, wherein an additional segment of the peripheral conductive structures extends from the third dielectric-filled gap to the fourth dielectric-filled gap, the additional segment forming additional antenna structures for an additional antenna in the electronic device.

* * * * *